(12) United States Patent
Hirayama et al.

(10) Patent No.: US 11,835,475 B2
(45) Date of Patent: Dec. 5, 2023

(54) INSPECTION POSITION IDENTIFICATION METHOD, THREE-DIMENSIONAL IMAGE GENERATION METHOD, AND INSPECTION DEVICE

(71) Applicant: SAKI CORPORATION, Tokyo (JP)

(72) Inventors: Takuma Hirayama, Tokyo (JP); Yosuke Yamamoto, Tokyo (JP)

(73) Assignee: SAKI CORPORATION, Tokyo (JP)

(*) Notice: Subject to any disclaimer, the term of this patent is extended or adjusted under 35 U.S.C. 154(b) by 3 days.

(21) Appl. No.: 17/804,587

(22) Filed: May 30, 2022

(65) Prior Publication Data
US 2022/0291147 A1 Sep. 15, 2022

Related U.S. Application Data

(63) Continuation of application No. 16/652,016, filed as application No. PCT/JP2018/035606 on Sep. 26, 2018, now Pat. No. 11,422,099.

(30) Foreign Application Priority Data

Sep. 28, 2017 (JP) ................................. 2017-187450
Sep. 28, 2017 (JP) ................................. 2017-187451

(51) Int. Cl.
*G01N 23/044* (2018.01)
*G01N 23/083* (2018.01)
(Continued)

(52) U.S. Cl.
CPC ........... *G01N 23/18* (2013.01); *G01N 23/044* (2018.02); *G01N 23/083* (2013.01); *G06T 7/001* (2013.01);
(Continued)

(58) Field of Classification Search
None
See application file for complete search history.

(56) References Cited

U.S. PATENT DOCUMENTS

| 5,550,376 A | 8/1996 | Gupta et al. |
| 6,895,073 B2 * | 5/2005 | Shih ...................... G01N 23/04 |
| | | 378/98.12 |

(Continued)

FOREIGN PATENT DOCUMENTS

| JP | 2005233760 A | 9/2005 |
| JP | 200826334 A | 2/2008 |

(Continued)

*Primary Examiner* — Thomas R Artman
(74) *Attorney, Agent, or Firm* — HAUPTMAN HAM, LLP

(57) ABSTRACT

An inspection position identification method that allows accurate inspection to be performed without in-advance identification of the position of an inspection plane in an inspected target. A three-dimensional image generation method that allows generation of a three-dimensional image for inspection without in-advance identification of the position of an inspection plane in an inspected target and then allows inspection to be performed. An inspection device including the methods. An inspection device includes a storage unit, which stores a radiation transmission image of an inspected object and a three-dimensional image generated from the radiation transmission image, and a control unit. The process carried out by the control unit for identifying an inspection position in a three-dimensional image includes identifying the position of a transmission picture of the inspection position in the radiation transmission image and identifying the inspection position in the three-dimensional image from the position of the transmission picture.

2 Claims, 8 Drawing Sheets

(51) Int. Cl.
  *G01N 23/18* (2018.01)
  *G06T 7/33* (2017.01)
  *G06T 15/08* (2011.01)
  *G06T 7/00* (2017.01)

(52) U.S. Cl.
  CPC .............. *G06T 7/337* (2017.01); *G06T 15/08* (2013.01); *G01N 2223/1016* (2013.01); *G01N 2223/401* (2013.01); *G01N 2223/417* (2013.01); *G01N 2223/6113* (2013.01); *G01N 2223/629* (2013.01); *G01N 2223/648* (2013.01); *G06T 2207/30141* (2013.01); *G06T 2207/30152* (2013.01)

(56) References Cited

U.S. PATENT DOCUMENTS

| | | | |
|---|---|---|---|
| 6,996,265 B1 | 2/2006 | Patnaik | |
| 7,013,038 B1 | 3/2006 | Patnaik | |
| 7,756,567 B2 | 7/2010 | Kuduvalli et al. | |
| 8,280,491 B2 | 10/2012 | Kuduvalli et al. | |
| 8,804,912 B2 | 8/2014 | Akahori | |
| 9,084,386 B2 * | 7/2015 | Wada | H05K 13/08 |
| 9,693,749 B2 | 7/2017 | Ni et al. | |
| 10,054,432 B2 * | 8/2018 | Kasahara | G01B 11/2527 |
| 10,111,625 B2 | 10/2018 | Toba | |
| 10,119,922 B2 | 11/2018 | Bernard et al. | |
| 10,433,810 B2 | 10/2019 | Ni et al. | |
| 10,912,530 B2 | 2/2021 | Mandelkern et al. | |
| 11,002,690 B2 | 5/2021 | Niizaka et al. | |
| 11,422,099 B2 * | 8/2022 | Hirayama | G06T 15/08 |
| 2004/0101109 A1 * | 5/2004 | Shih | G06T 7/001 |
| | | | 378/207 |
| 2005/0049478 A1 | 3/2005 | Kuduvalli et al. | |
| 2006/0188141 A1 | 8/2006 | Patnaik | |
| 2008/0130983 A1 | 6/2008 | Patnaik | |
| 2010/0034452 A1 | 2/2010 | Gines | |
| 2010/0183118 A1 | 7/2010 | Star-Lack et al. | |
| 2010/0239153 A1 | 9/2010 | Kuduvalli et al. | |
| 2012/0014498 A1 | 1/2012 | Akahori | |
| 2012/0294508 A1 | 11/2012 | Wada et al. | |
| 2015/0204989 A1 | 7/2015 | Ni et al. | |
| 2016/0183887 A1 | 6/2016 | Toba | |
| 2017/0074808 A1 | 3/2017 | Bernard et al. | |
| 2017/0251995 A1 | 9/2017 | Ni et al. | |
| 2018/0080763 A1 * | 3/2018 | Kasahara | G06T 7/0002 |
| 2020/0022669 A1 | 1/2020 | Ni et al. | |
| 2020/0124545 A1 | 4/2020 | Nizaka et al. | |
| 2020/0264113 A1 | 8/2020 | Hirayama et al. | |
| 2022/0291147 A1 * | 9/2022 | Hirayama | G01N 23/046 |

FOREIGN PATENT DOCUMENTS

| | | | | |
|---|---|---|---|---|
| JP | 2009080055 A | * | 4/2009 | .......... G01B 15/025 |
| JP | 2009174972 A | | 8/2009 | |
| JP | 2011247588 A | | 12/2011 | |
| JP | 201715655 A | | 1/2017 | |
| WO | 2012156862 A1 | | 11/2012 | |

* cited by examiner

[Fig. 1]
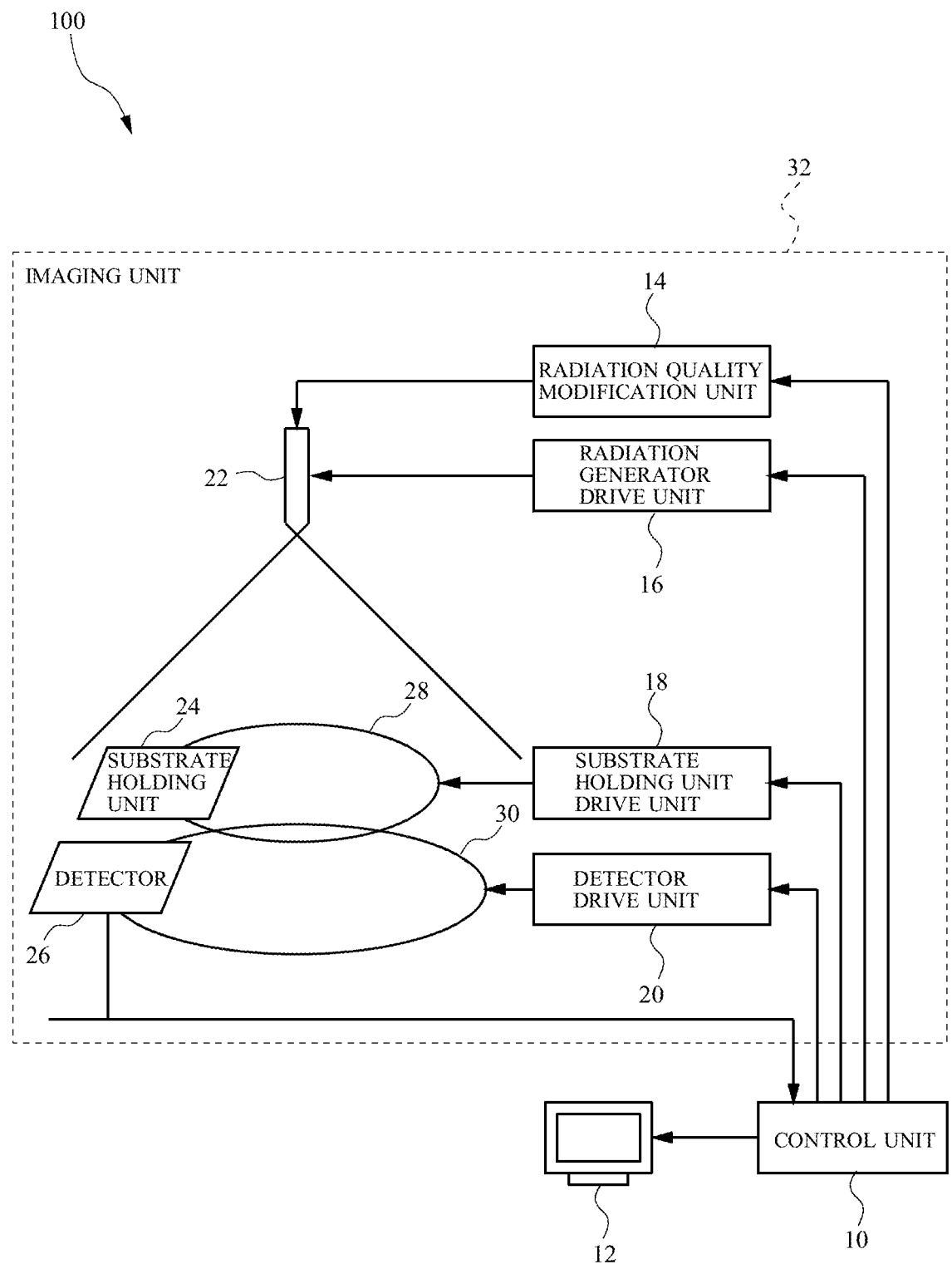

[Fig. 2]
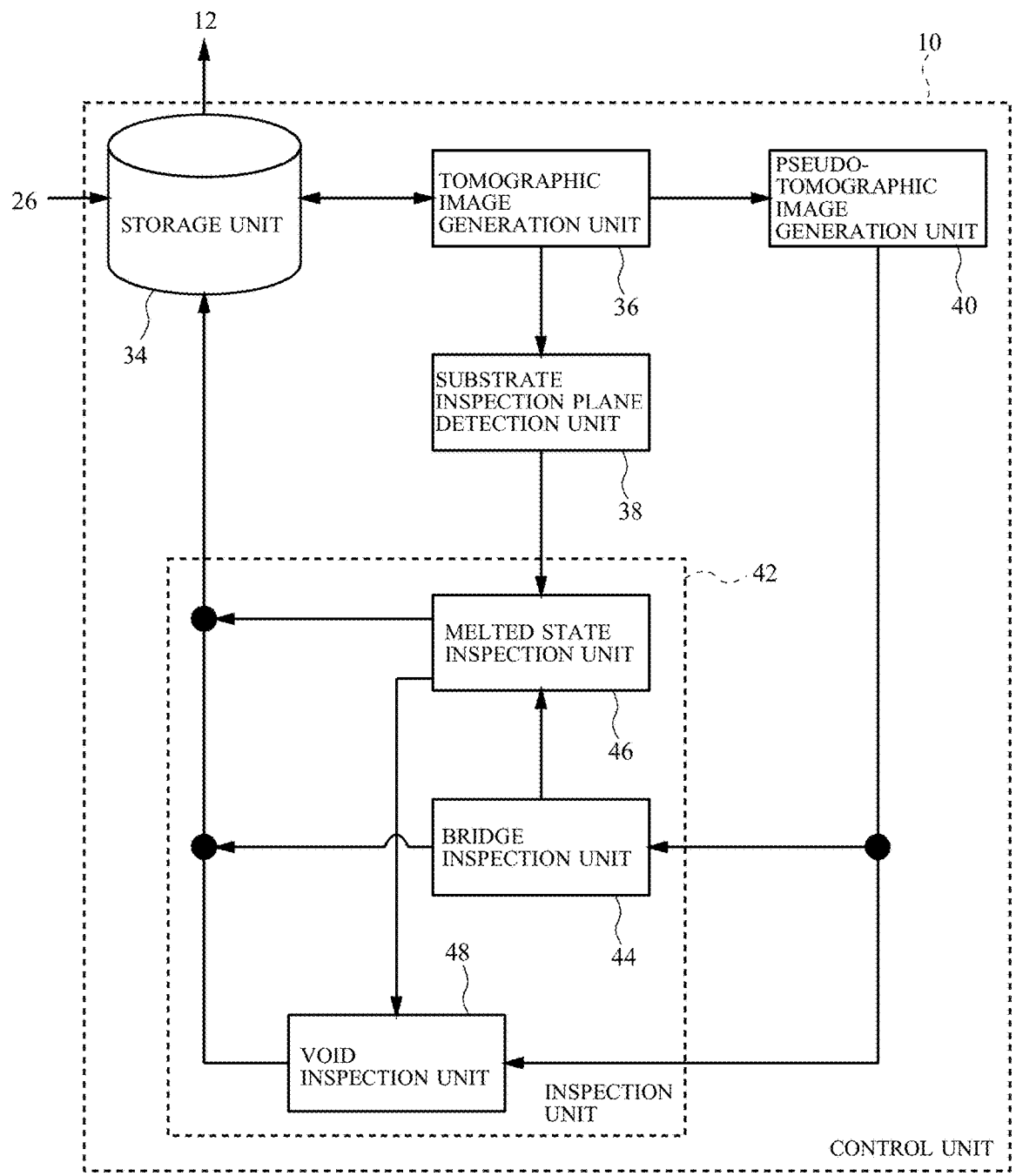

[Fig. 3]
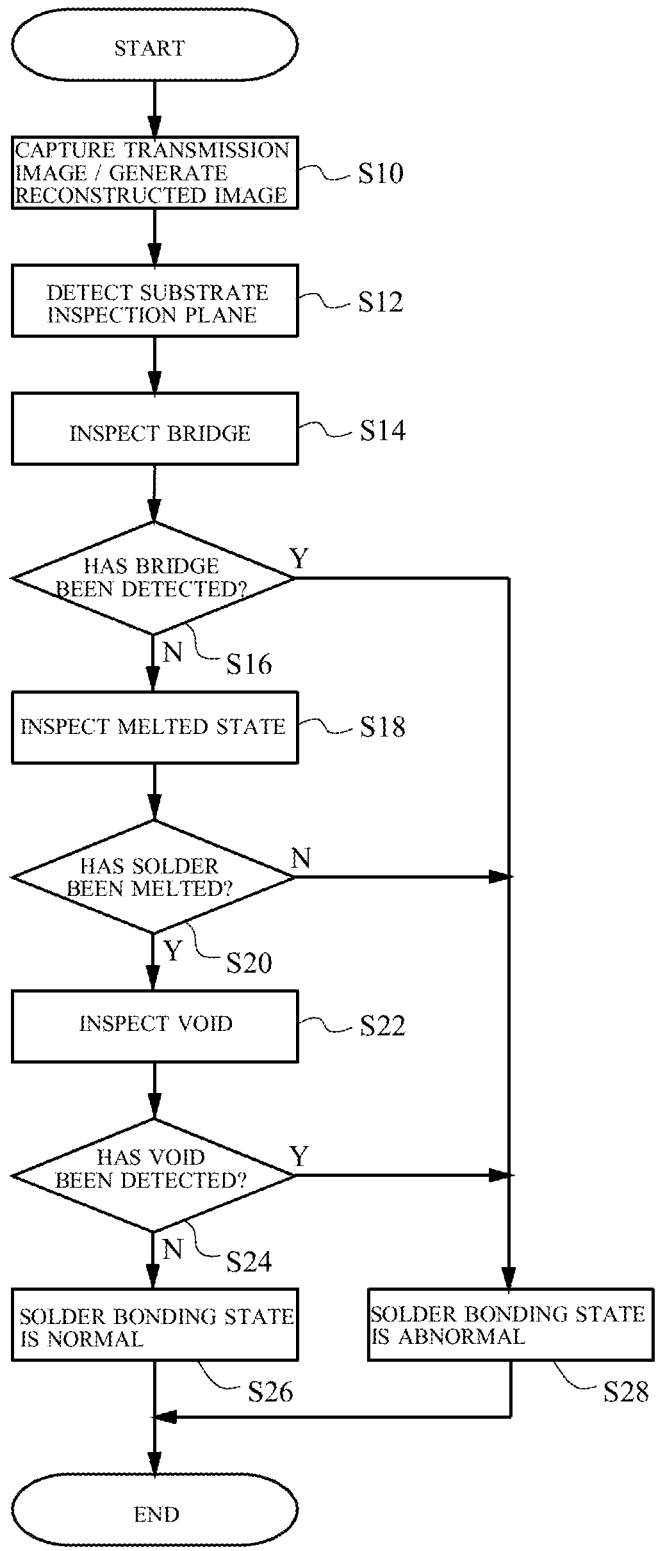

[Fig. 4]
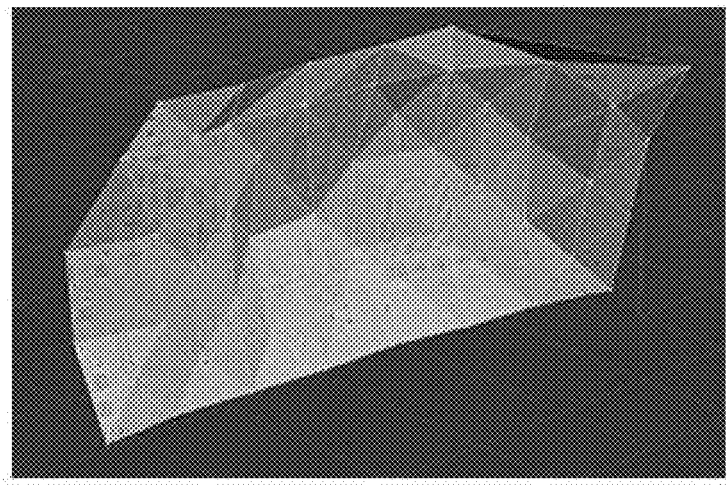

[Fig. 5A]
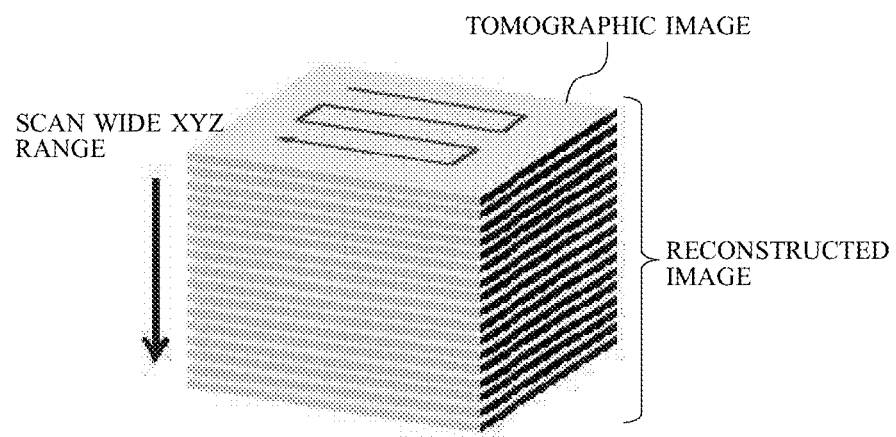
[Fig. 5B]
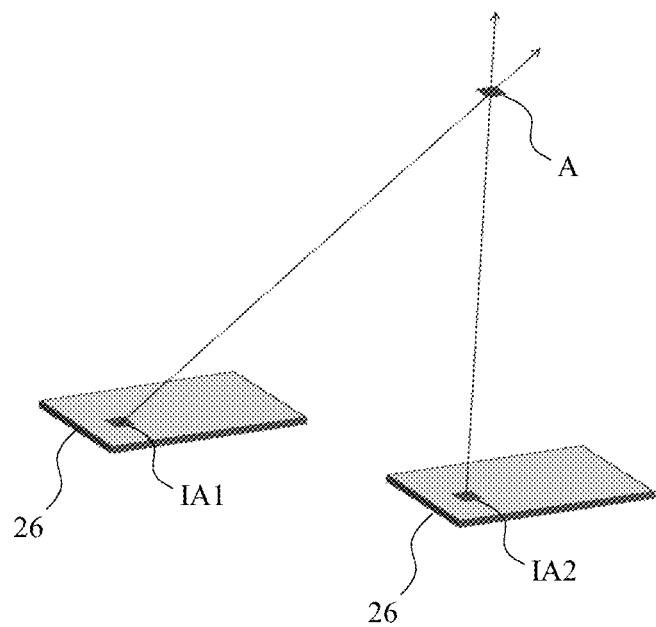

[Fig. 6A]
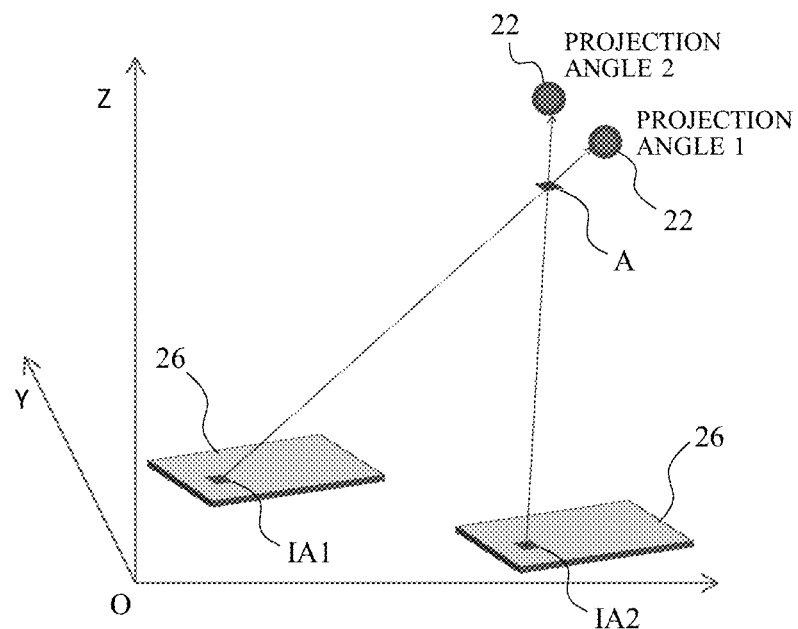
[Fig. 6B]
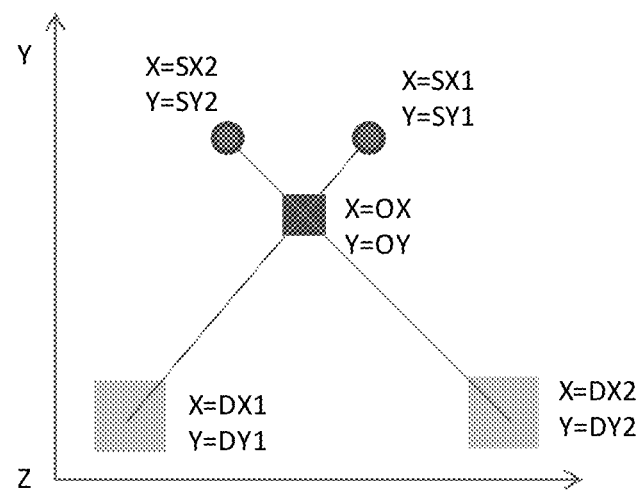

[Fig. 7]
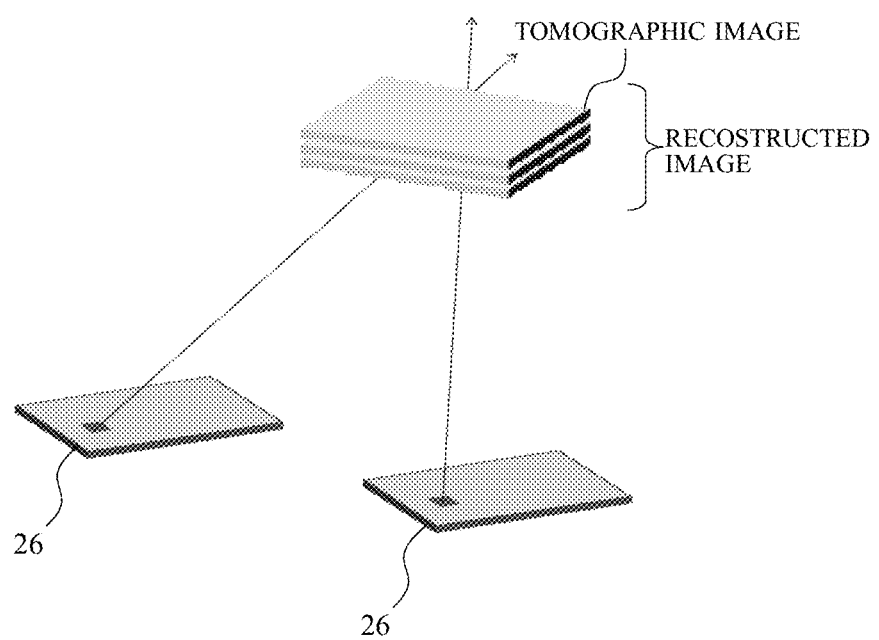

[Fig. 8]
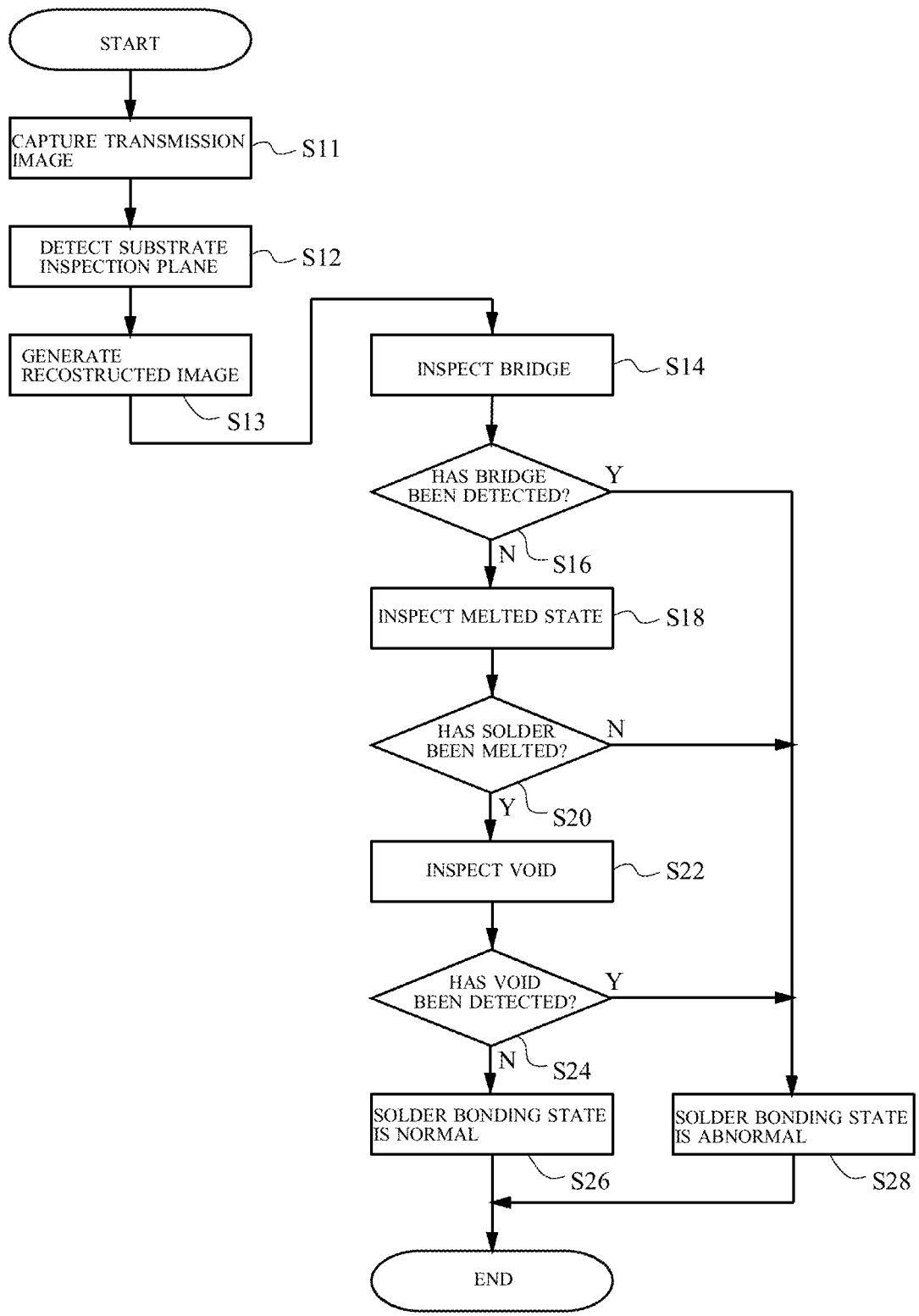

INSPECTION POSITION IDENTIFICATION METHOD, THREE-DIMENSIONAL IMAGE GENERATION METHOD, AND INSPECTION DEVICE

The present application is a continuation of U.S. patent application Ser. No. 16/652,016 filed on Mar. 27, 2020, which is a National Phase of International Application No. PCT/JP2018/035606, filed Sep. 26, 2018, and claims priority based on Japanese Patent Application No. 2017-187450, filed Sep. 28, 2017 and Japanese Patent Application No. 2017-187451, filed Sep. 28, 2017. The contents of the above applications are incorporated herein by reference in their entirety.

TECHNICAL FIELD

The present invention relates to an inspection position identification method in inspecting an inspected object, a three-dimensional image generation method, and an inspection device including the methods.

BACKGROUND ART

As an inspection device that measures the shape of solder on top and bottom surfaces of a substrate, there is an X-ray inspection device based on tomosynthesis (see Patent Literature 1, for example).

CITATION LIST

Patent Literature

Patent Literature 1: Japanese Patent Laid-Open No. 2008-026334

SUMMARY OF INVENTION

Technical Problem

However, such an X-ray inspection device needs to identify the positions of the top and bottom surfaces of the substrate in a Z direction (X-ray projection direction or height direction with respect to top surface of substrate), for example, with a laser length measurer in advance and reconstruct a tomographic image at the height or extract an optimum Z-direction image out of the reconstructed tomographic image, resulting in a problem of a long inspection period.

The present invention has been made in view of the problem described above, and an object is to provide an inspection position identification method that allows accurate inspection to be performed without in-advance identification of the position of an inspection plane (Z-direction position) in an inspected target, a three-dimensional image generation method that allows generation of a three-dimensional image necessary for inspection without in-advance identification of the position of an inspection plane (Z-direction position) in an inspected target and then allows inspection to be performed, and an inspection device including the methods.

Solution to Problem

To solve the problem, an inspection position identification method according to a first present invention is an inspection position identification method for identifying an inspection position in a three-dimensional image generated from a radiation transmission image of an inspected object, the method being characterized by including: a step of identifying a position of a transmission picture of the inspection position in the radiation transmission image; and a step of identifying the inspection position in the three-dimensional image from the position of the transmission picture.

In this sort of inspection position identification method according to the present invention, the step of identifying the position of a transmission picture preferably performs the identification by using a shape of a transmission picture of a specific pattern or mark in the inspection position or in a vicinity of the inspection position.

An inspection device according to the present invention is characterized by including: a storage unit that stores the radiation transmission image and the three-dimensional image; and a control unit that extracts the radiation transmission image from the storage unit and identifies the inspection position in the three-dimensional image by using the inspection position identification method described above.

A three-dimensional image generation method according to a second present invention is a three-dimensional image generation method for generating a three-dimensional image of an inspected object from a radiation transmission image of the inspected object, the method being characterized by including: a step of identifying a position of a transmission picture of an inspection position in the inspected object in the radiation transmission image; a step of identifying the inspection position in the three-dimensional image from the position of the transmission picture; and a step of generating a three-dimensional image of the inspected object containing the inspection position from the radiation transmission image.

In the three-dimensional image generation method according to the present invention, the step of identifying the position of a transmission picture preferably performs the identification by using a shape of a transmission picture of a specific pattern or mark in the inspection position or in a vicinity of the inspection position.

An inspection device according to the present invention is characterized by including: a storage unit that stores the radiation transmission image and the three-dimensional image; and a control unit that extracts the radiation transmission image from the storage unit and generates a three-dimensional image of the inspected object by using the three-dimensional image generation method described above.

Advantageous Effect of Invention

The inspection position identification method according to the present invention allows accurate inspection to be performed without in-advance identification of the position of an inspection plane (Z-direction position) in an inspected target.

BRIEF DESCRIPTION OF DRAWINGS

FIG. 1 is a descriptive diagram showing the configuration of an inspection device according to an embodiment.

FIG. 2 is a descriptive diagram of each functional block processed by a control unit of the inspection device.

FIG. 3 is a flowchart for describing the procedure of inspection.

FIG. 4 is a descriptive diagram showing the amount of correction in a reconstructed space.

FIGS. 5A and 5B are descriptive diagrams showing a substrate inspection plane identification method. FIG. 5A shows the method in a first embodiment, and FIG. 5B shows the method in a second embodiment.

FIGS. 6A and 6B are descriptive diagrams for describing a method for determining a position in a reconstructed image from two transmission images.

FIG. 7 is a descriptive diagram showing a substrate inspection plane identification method in a third embodiment.

FIG. 8 is a flowchart for describing the procedure of inspection in the third embodiment.

DESCRIPTION OF EMBODIMENT

A preferred embodiment of the present invention will be described below with reference to the drawings. An inspection device 100 according to the present embodiment is configured by including a control unit 10 constituted by a processing device such as a PC, a monitor 12, and an imaging unit 32, as shown in FIG. 1. The imaging unit 32 further includes a radiation quality modification unit 14, a radiation generator drive unit 16, a substrate holding unit drive unit 18, a detector drive unit 20, a radiation generator 22, a substrate holding unit 24, and a detector 26.

The radiation generator 22 is a device that generates radiation such as X rays. For example, the radiation generator 22 generates radiation by causing accelerated electrons to collide with a target such as tungsten or diamond.

The substrate holding unit 24 holds a substrate that is an inspected object. The substrate held by the substrate holding unit 24 is irradiated with the radiation generated by the radiation generator 22, and the detector 26 captures an image of the radiation having passed through the substrate. A radiation transmission image of the substrate captured with the detector 26 is hereinafter referred to as a "transmission image." In the present embodiment, the substrate holding unit 24 holding the substrate and the detector 26 are moved relative to the radiation generator 22, and a plurality of transmission images are acquired to generate a reconstructed image.

The transmission images captured with the detector 26 are sent to the control unit 10, and a known technology such as a filtered-backprojection method (FBP method), is used to reconstruct the transmission images into an image containing the stereoscopic shape of solder at a bonded portion. The reconstructed image and the transmission images are stored in a storage in the control unit 10 or an external storage that is not shown. A reconstructed three-dimensional image containing the stereoscopic shape of solder at a bonded portion based on the transmission images is hereinafter referred to as a "reconstructed image." An image cut from the reconstructed image and showing an arbitrary cross-section is referred to as a "tomographic image." The thus generated reconstructed image and tomographic image are output to the monitor 12. The monitor 12 displays not only the reconstructed image and the tomographic image but, for example, the result of inspection of the solder bonding state, which will be described later. The reconstructed image in the present embodiment is also referred to as a "planar CT" because it is reconstructed from planar images captured with the detector 26, as described above.

The radiation quality modification unit 14 modifies the quality of the radiation generated by the radiation generator 22. The quality of the radiation is determined by the voltage applied to accelerate the electrons to be caused to collide with the target (hereinafter referred to as "tube voltage") and current that determines the number of electrons (hereinafter referred to as "tube current"). The radiation quality modification unit 14 is a device that controls the tube voltage and the tube current. The radiation quality modification unit 14 can be implemented by using known technologies such as a transformer and a rectifier.

The quality of the radiation is determined by the luminance and hardness of the radiation (spectral distribution of radiation). Increasing the tube current increases the number of electrons that collide with the target and therefore increases the number of photons in the generated radiation. As a result, the luminance of the radiation increases. For example, some components, such as capacitors, are thicker than the other components and need to be irradiated with high luminance radiation for capture of transmission images of the thicker components. In this case, the tube current is adjusted to adjust the luminance of the radiation. Increasing the tube voltage increases the energy of the electrons that collide with the target and therefore increases the energy (spectrum) of the generated radiation. In general, the greater the energy of the radiation, the greater the penetration force of the radiation to the object, and the harder it is for the radiation to be absorbed by the object. Transmission images captured by using such radiation have low contrast. The tube voltage can therefore be used to adjust the contrast of the transmission images.

The radiation generator drive unit 16 includes a drive mechanism that is not shown, such as a motor, and can move the radiation generator 22 upward and downward along the axis passing through the focal point of the radiation generator 22. It is therefore possible to change the distance between the radiation generator 22 and the inspected object (substrate) held by the substrate holding unit 24 to change the irradiation field, whereby the magnification of the transmission images captured with the detector 26 can be changed.

The detector drive unit 20 also includes a drive mechanism that is not shown, such as a motor, which rotates the detector 26 to move along a detector rotation trajectory 30. The substrate holding unit drive unit 18 also includes a drive mechanism that is not shown, such as a motor, and translates the substrate holding unit 24 along a flat plane in which a substrate rotation trajectory 28 is provided. The substrate holding unit 24 is configured to rotate to move along the substrate rotation trajectory 28 in conjunction with the rotating motion of the detector 26. A plurality of transmission images can thus be captured along different projection directions and at different projection angles with the relative positional relationship between the substrate held by the substrate holding unit 24 and the radiation generator 22 changed.

The turning radius of each of the substrate rotation trajectory 28 and the detector rotation trajectory 30 is not fixed but can be freely changed. The irradiation angle at which a component disposed on the substrate is irradiated with the radiation can therefore be arbitrarily changed.

The control unit 10 controls the entire operation of the inspection device 100 described above. A variety of functions of the control unit 10 will be described below with reference to FIG. 2. Although not shown, an input device, such as a keyboard and a mouse, is connected to the control unit 10.

The control unit 10 includes a storage unit 34, a tomographic image generation unit 36, a substrate inspection plane detection unit 38, a pseudo-tomographic image generation unit 40, and an inspection unit 42. Although not shown, the control unit 10 further includes an imaging control unit that controls the radiation quality modification unit 14, the radiation generator drive unit 16, the substrate holding unit drive unit 18, and the detector drive unit 20. Each of these functional blocks may be implemented by cooperation between hardware, such as a CPU that performs a variety of types of computation processing and a RAM used as a work area for data storage and program execution, and software. The functional blocks can therefore be implemented in a variety of forms based on the combination of the hardware and the software.

The storage unit 34 stores imaging conditions for capturing transmission images of the substrate, design information and the like of the substrate, which is the inspected object, and other pieces of information. The storage unit 34 further stores the transmission images and a reconstructed image (tomographic image and pseudo-tomographic image) of the substrate, the result of inspection performed by the inspection unit 42, which will be described later, and the like. The storage unit 34 still further stores the speed at which the radiation generator drive unit 16 drives the radiation generator 22, the speed at which the substrate holding unit drive unit 18 drives the substrate holding unit 24, and the speed at which the detector drive unit 20 drives the detector 26.

The tomographic image generation unit 36 generates tomographic images based on a plurality of transmission images acquired from the storage unit 34. This can be implemented by using a known technology, for example, the FBP method and a maximum likelihood method. Different reconstruction algorithms cause different characteristics of the resulting reconstructed images and different periods required for the reconstruction. In view of the fact described above, a configuration may be adopted in which a plurality of reconstruction algorithms and parameters used in the algorisms may be prepared in advance, and a user may select any of the prepared reconstruction algorithms and parameters. Thereby, priority can be given to reduction in the period necessary for the reconstruction or priority to improvement in the image quality at the sacrifice of a long period, that is, the user can thus be provided with selection flexibility. A generated tomographic image is output to the storage unit 34 and recorded in the storage unit 34.

The substrate inspection plane detection unit 38 identifies the position (tomographic image) of a displayed inspection target plane of the substrate (top surface of substrate, for example) out of the plurality of tomographic images generated by the tomographic image generation unit 36. The tomographic image that displays the inspection plane of the substrate is hereinafter referred to as an "inspection plane image." An inspection plane image detection method will be described later in detail.

The pseudo-tomographic image generation unit 40 stacks a predetermined number of continuous tomographic images out of the tomographic images generated by the tomographic image generation unit 36 to visualize a substrate area thicker than each tomographic image. The number of stacked tomographic images is determined by the thickness of the substrate area displayed by the tomographic images (hereinafter referred to as "slice thickness") and the slice thickness of the pseudo-tomographic image. For example, when the slice thickness of each tomographic image is 50 µm, and the height of a BGA solder ball (hereinafter simply referred to as "solder") (500 µm, for example) is set as the slice thickness of the pseudo-tomographic image, 500/50=10 tomographic images may be stacked. In this process, the inspection plane image identified by the substrate inspection plane detection unit 38 is used to identify the position of the solder.

The inspection unit 42 inspects the solder bonding state based on the tomographic images generated by the tomographic image generation unit 36, the inspection plane image identified by the substrate inspection plane detection unit 38, and the pseudo-tomographic image generated by the pseudo-tomographic image generation unit 40. Since the solder that bonds a component to the substrate is located in the vicinity of the substrate inspection plane, inspecting the inspection plane image and tomographic images that display an area on a side of the inspection plane image that is the side facing the radiation generator 22 allows evaluation of whether the solder has appropriately bonded the component to the substrate.

The term "solder bonding state" means whether the solder has bonded the component to the substrate in such a way that an appropriate electrically conductive path is generated. Inspection of the solder bonding state includes bridge inspection, melted state inspection, and void inspection. The term "bridge" means a non-preferable inter-conductor electrically conductive path generated by the solder bonding. The term "melted state" means a state in which the bonding between the substrate and the component is insufficient or not due to insufficient solder melting or a state in which what is called "floating" has occurred or not. The term "void" means solder bonding failure due to air bubbles in the solder bonded portion. The inspection unit 42 therefore includes a bridge inspection unit 44, a melted state inspection unit 46, and a void inspection unit 48.

The operation of each of the bridge inspection unit 44, the melted state inspection unit 46, and the void inspection unit 48 will be described later in detail. The bridge inspection unit 44 and the void inspection unit 48 inspect bridges and voids, respectively, based on the pseudo-tomographic image generated by the pseudo-tomographic image generation unit 40, and the melted state inspection unit 46 inspects the solder melted state based on the inspection plane image identified by the substrate inspection plane detection unit 38. The results of the inspection performed by the bridge inspection unit 44, the melted state inspection unit 46, and the void inspection unit 48 are recorded in the storage unit 34.

FIG. 3 is a flowchart showing the procedure from the capture of transmission images, the generation of a reconstructed image, and the identification of an inspection plane image to the inspection of the solder bonding state. The processes in the present flowchart start, for example, when the control unit 10 accepts an inspection start instruction from an input device that is not shown.

The control unit 10 causes the radiation generator drive unit 16 to set a field irradiated with the radiation radiated by the radiation generator 22, causes the substrate holding unit drive unit 18 to move the substrate holding unit 24, causes the detector drive unit 20 to move the detector 26 to change the imaging position, causes the radiation quality modification unit 14 to set the quality of the radiation from the radiation generator 22, causes the radiation generator 22 to radiate the radiation to the substrate, causes the detector 26 to capture transmitted images, and further causes the tomographic image generation unit 36 and the pseudo-tomographic image generation unit 40 to generate a reconstructed image from the plurality of thus captured transmission images (step S10).

The substrate inspection plane detection unit 38 in the control unit 10 then receives the transmitted images or the reconstructed image (tomographic images) from the tomographic image generation unit 36 and identifies an inspection plane image from the received images (step S12). The bridge inspection unit 44 acquires a pseudo-tomographic image displaying a solder ball and having a slice thickness roughly equal to the height of the solder ball from the pseudo-tomographic image generation unit 40 and inspects the presence or absence of bridge (step S14). In a case where no bridge has been detected ("N" in step S16), the melted state inspection unit 46 acquires the inspection plane image from the substrate inspection plane detection unit 38 and inspects whether the solder has been melted (step S18). When the solder has been melted ("Y" in step S20), the void inspection unit 48 acquires a pseudo-tomographic image partially displaying the solder ball from the pseudo-tomographic image generation unit 40 and inspects whether a void is present (step S22). When no void is found ("N" in step S24), the void inspection unit 48 determines that the solder bonding state is normal (step S26) and outputs the result of the evaluation to the storage unit 34. When a bridge is found ("Y" in step S16), the solder has not melted ("N" in step S20), and a void is present ("Y" in step S24), the bridge inspection unit 44, the melted state inspection unit 46, and the void inspection unit 48 determine that the solder bonding state is abnormal (step S28) and outputs the result of the evaluation to the storage unit 34. When the state of the solder is output to the storage unit 34, the processes in the present flowchart are terminated.

As described above, a reconstructed image (reconstructed space), which is a three-dimensional image reconstructed from transmission images, contains image data on the substrate having errors resulting from, for example, inclination, shift, bending, rotation, and expansion/shrinkage. Therefore, to perform automatic inspection, it is necessary to perform position correction in consideration of the errors and identify an inspection plane image based on the position correction. An inspection position (substrate inspection plane) identification method (error correction method) in the substrate inspection plane detection process S12 will be described below.

First Embodiment

A first embodiment of the inspection position identification method will be described below. In the aforementioned generation of a reconstructed image (step S10), planar CT computation is performed over a wide range containing the top and bottom surfaces of the substrate (range in consideration of errors, such as aforementioned warpage of substrate) to acquire a three-dimensional image (reconstructed image) containing the errors, such as warpage of the substrate, and information on substrate design is used to detect, from the three-dimensional image (reconstructed image), the shape of a specific pattern or mark (image of specific pattern or mark) for identifying the inspection position in X, Y, and Z directions over a plurality of tomographic images. The substrate inspection plane (inspection plane image) is thus determined.

The term "information on substrate design" refers to Gerber data and CAD (computer aided design) data and are stored in advance in the storage unit 34 described above. Recorded information on the coordinates of the solder bonded portion is called the Gerber data, and information on the type of a mounted component and the coordinates of the mounted position recorded in the storage unit 34 is called the CAD data. The coordinates of the solder bonded portion and the component mounted position are expressed as the coordinates in an X and Y coordinate system set on the substrate. Referring to the Gerber data and the CAD data and performing image matching (pattern matching) or any other processing on the reconstructed image (tomographic images) allow the type and size of the component present on the substrate and the positions of the component and the solder bonded portion to be obtained, that is, the inspection position (inspection plane image) to be identified.

Specifically, a substrate surface image that serves as a template is registered for each of the top and bottom surfaces of the substrate for the field of view (FOV) of each transmission image or for each of 4 areas of the FOV that are 2×2=4 divided areas thereof (Gerber data and CAD data described above can be used). Image matching is then performed by using the registered template in a predetermined XYZ search range on an FOV basis of each substrate under imaging, and a position where highest coincidence is achieved is used as the amount of shift. Detection of the amount of shift for each FOV or for each of the 4 divided areas of the FOV allows one or four amounts of shift in one FOV to be obtained, and the amounts of shift are each expressed as the vertex of a triangle over the entire substrate, as shown in FIG. 4. To perform an inspection the area surrounded by each of the triangles, the amount of correction is calculated from the amount of shift expressed by the vertex of the triangle (amount of shift from reference surface is calculated), and an inspection plane image is determined based on the amount of correction. Using the amount of shift expressed by the vertex of a triangle allows correction of the shift in the X, Y, and Z directions and correction of the rotation around the X, Y, and Z axes. When there are a plurality of inspection locations, tomographic images are determined from the errors described above in accordance with each inspection location, and the determined tomographic images are used to generate a pseudo-tomographic image, followed by inspection, and the same processes are carried out at the following inspection location. For an inspection target component that requires further high-precision position correction, the position correction is performed individually. In this case, the surfaces of the substrate have been roughly detected in advance by the image matching, whereby the processes can be carried out over a limited search range and therefore at high speed.

Second Embodiment

In the inspection position (substrate inspection plane) identification method according to the first embodiment, a three-dimensional image (reconstructed image) over a range in consideration of the errors, such as warpage of the substrate, is reconstructed from transmission images, and the three-dimensional image is used to identify the inspection position, as shown in FIG. 5A. In contrast, in the inspection position (substrate inspection plane) identification method according to a second embodiment, the shape of an image of a specific pattern or mark (transmission pictures) IA1 and IA2 is detected in two or more transmission images, and the position of the shape of the specific pattern or mark (image of specific pattern or mark in three-dimensional image) A in the three-dimensional image (reconstructed image) is identified based on the X, Y, and Z positions of the transmission pictures in each of the transmission images to determine an inspection plane image, as shown in FIG. 5B.

A method for identifying the position of the image A of a specific pattern or mark in a reconstructed image (position where three-dimensional image A of specific pattern or mark is present in reconstructed space (reconstructed image)) from the position where transmission pictures of the specific pattern or mark (points IA1 and IA2 in the description) have been detected in two transmission images will be described with reference to FIGS. 6A and 6B. In the inspection device 100 according to the present embodiment, an inspection target substrate (substrate holding unit 24) and the detector 26 are moved relative to a fixed radiation source (radiation generator 22) to capture a plurality of transmission images with the radiation projection angle with respect to the substrate changed, as shown in FIG. 1. FIG. 6A shows a case where the inspection target substrate is fixed and the radiation source (radiation generator 22) and the detector 26 are moved. A position (coordinates) in FIGS. 6A and 6B can be determined in calculation by using the positions of the radiation source (radiation generator 22), the substrate (substrate holding unit 24), and the detector 26 in the inspection device 100 (positions with respect to predetermined origin in inspection device 100). In FIGS. 6A and 6B, the reference position (reference point) is O.

First, the position of the radiation source at a first projection angle (coordinates representing radiation radiated from radiation generator 22) is set at (SX1, SY1, SZ1), the position where the detector 26 has detected the transmission picture IA1 of the specific pattern or mark is set at (DX1, DY1, DZ1), and the position of the image A of the specific pattern or mark in the reconstructed image is set at (OX, OY, OZ). The position of the radiation source at a second projection angle is set at (SX2, SY2, SZ2), and the position of the transmission picture IA2 in the detector 26 is set at (DX2, DY2, DZ2). OX and OY, which are X/Y-direction positions of the image A of the specific pattern or mark in the reconstructed image, may be determined as points in the X and Y planes where the straight line that connects the coordinates of the radiation source and the detector at the first projection angle intersect the straight line that connects the coordinates of the radiation source and the detector at the second projection angle, as shown in FIG. 6B and are determined by solving simultaneous equations (1) and (2) below for OX and OY.

$$OY=(SY1-DY1)/(SX1-DX1)\cdot OX+(SX1\cdot DY1-SY1\cdot DX1)/(SX1-DX1) \quad (1)$$

$$OY=(SY2-DY2)/(SX2-DX2)\cdot OX+(SX2\cdot DY2-SY2\cdot DX2)/(SX2-DX2) \quad (2)$$

OZ, which is the Z-direction position of the image A of the specific pattern or mark in the reconstructed image, can be determined from Expression (3) below by using the value of OX determined by Expressions (1) and (2) described above.

$$OZ=(SZ1-DZ1)/(SX1-DX1)\cdot(OX-DX1) \quad (3)$$

As described above, in the substrate inspection plane detection process S12 in the second embodiment, the inspection position in the substrate (inspection plane image in reconstructed image) is identified from the plurality of transmission images acquired in step S10. Specifically, the shape of a transmission picture of the specific pattern or mark is detected in transmission images, for example, by using image matching, and the position of the transmission picture along with Expressions described above is used to determine the position of the pattern or mark in the reconstructed image to identify an inspection plane image. The inspection can then be performed by using the inspection plane image (tomographic image) in the accurate position. The inspection position (inspection plane image) is not identified from the entire three-dimensional image (reconstructed image) but is identified from the transmission images the amount of data of which is smaller than the amount of data of the reconstructed image, resulting in a decrease in the period for the identification. As a result, the overall inspection period can be shortened. In a case where there are a plurality of inspection target locations, the shape of the specific pattern or mark (shape of transmission picture) at an inspection location or in the vicinity of the inspection location is registered, and the position of the shape in each of the transmission image is identified by image matching. The position (inspection plane image) in the reconstructed image can thus be identified.

Referring to three positions of the specific pattern or mark allows generation of a pseudo-tomographic image in consideration of the positions in the X and Y directions and the rotation around the X, Y, and Z axes instead of only the position in the Z direction and the rotation around the Z direction. Further, referring to four or more positions of the specific pattern or mark and using a known interpolation method, such as linear interpolation, parabolic interpolation, and cubic interpolation, allow generation of a pseudo-tomographic image in consideration of bending of the target object.

Third Embodiment

In the first and second embodiments, after transmission images are captured, a reconstructed image is generated in step S10, and the transmission images or the reconstructed image is used to identify a substrate inspection plane in step S12, as shown in FIG. 3. The third embodiment is configured such that the inspection position (substrate inspection plane) in the reconstructed space is identified from the transmission images, and a reconstructed image containing the identified position (reconstructed image containing specific pattern or mark) is reconstructed, as shown in FIG. 7.

FIG. 8 shows a flowchart for inspection of the solder bonding state in the third embodiment, and the same processes as those described above have the same reference characters and detailed descriptions thereof will be omitted. When the inspection starts, the control unit 10 causes the radiation generator drive unit 16 to set the field irradiated with the radiation radiated from the radiation generator 22, causes the substrate holding unit drive unit 18 to move the substrate holding unit 24, causes the detector drive unit 20 to move the detector 26 to change the imaging position, causes the radiation quality modification unit 14 to set the quality of the radiation from the radiation generator 22, causes the radiation generator 22 to radiate the radiation to the substrate, and causes the detector 26 to capture transmitted images (step S11), as described above. The transmission images are then used to identify the position of an image of the inspection target in the transmission images, for example, by using image matching, and the position of the image of the inspection target in the reconstructed space (reconstructed image) is identified from the identified position (step S12), as described in the second embodiment. A reconstructed image (inspection plane image or tomographic images) containing the position identified in step S12 is then generated (step S13). The inspection of the solder bonding state by using the reconstructed image is the same as the inspection described above (steps S14 to S28).

According to the third embodiment, in which the generation of a reconstructed image is limited to a portion containing the inspection target, the amount of data on the reconstructed image decreases, resulting in a decrease in the period for the generation of the reconstructed image. As a result, the overall inspection period can be shortened.

The invention claimed is:

1. An inspection device that inspects an inspected substrate using a three-dimensional image generated from a radiation transmission image of the inspected substrate, the device being characterized by comprising:
- a radiation generator for irradiating the inspected substrate with radiation;
- an inspected substrate holding unit that holds the inspected substrate;
- a first drive mechanism for moving the inspected substrate holding unit around an axis passing through a focal point of the radiation of the radiation generator;
- a radiation detector for detecting the radiation having passed through the inspected substrate;
- a second drive mechanism for moving the radiation detector around the axis passing through the focal point of the radiation of the radiation generator;
- a control unit that generates a three-dimensional image from a radiation transmission image detected by the radiation detector; and
- an inspection area identification unit that divides a tomographic image in the three-dimensional image into a plurality of areas, calculates a piece of shift information with respect to a reference image corresponding to a surface of the inspected substrate for each of the plurality of areas, and identifies an inspection area in the three-dimensional image based on an amount of correction calculated based on the plurality of pieces of shift information.

2. An inspection area identification method for identifying an inspection plane in a three-dimensional image generated from a radiation transmission image of an inspected substrate, the method being characterized by comprising:
- a step of dividing a tomographic image in the three-dimensional image into a plurality of areas and calculating a piece of shift information with respect to a reference image corresponding to a surface of the inspected substrate for each of the plurality of areas;
- a step of calculating an amount of correction from the plurality of pieces of shift information; and
- a step of identifying an inspection area to be inspected in the three-dimensional image based on the amount of correction.

* * * * *